H. BROCK.
MACHINE FOR FORMING PLASTIC TILE.
APPLICATION FILED FEB. 4, 1921.

1,418,227.

Patented May 30, 1922.
9 SHEETS—SHEET 1.

INVENTOR
HOLDEN BROCK

ATTORNEY.

H. BROCK.
MACHINE FOR FORMING PLASTIC TILE.
APPLICATION FILED FEB. 4, 1921.

1,418,227.

Patented May 30, 1922.
9 SHEETS—SHEET 4.

INVENTOR
HOLDEN BROCK
by
ATTORNEY.

Fig. 18.

INVENTOR
HOLDEN BROCK

UNITED STATES PATENT OFFICE.

HOLDEN BROCK, OF ST. LOUIS, MISSOURI.

MACHINE FOR FORMING PLASTIC TILE.

1,418,227.  Specification of Letters Patent.  Patented May 30, 1922.

Application filed February 4, 1921. Serial No. 442,467.

*To all whom it may concern:*

Be it known that I, HOLDEN BROCK, a citizen of the United States, and a resident of St. Louis, in the State of Missouri, have invented certain new and useful Improvements in Machines for Forming Plastic Tile, of which the following is a specification.

My present invention relates generally to the manufacture of plastic tile or shingles for roofing and similar purposes and more particularly to a machine which will form and deliver plastic bodies in shape ready for drying, and in a continuous, effective and efficient manner, my primary object being the provision of a machine which will continuously operate to accomplish the bulk of the work in a wholly mechanical manner and reduce to a minimum the necessary manual efforts required in its control, regulation and upkeep.

In carrying out my invention I propose a machine in which there is an endless feed of form plates shaped to correspond with one side or face of the finished tile, to and through a series of operating stations where the plastic material is successively placed, rolled, troweled, dusted, again troweled, and finally discharged, and these several operations are accomplished without the necessity of skilled labor and in fact without the necessity of any labor except to maintain the supply of the form plates and the material fed thereto, beyond the mere upkeep of the operating parts themselves.

My invention further aims to provide a machine of this nature which will be strong, durable and yet simple in construction and capable of uniform efficiency for the intended purposes.

In the accompanying drawings which illustrate my invention and form a part of this specification.

Figures 6, 7, 8:
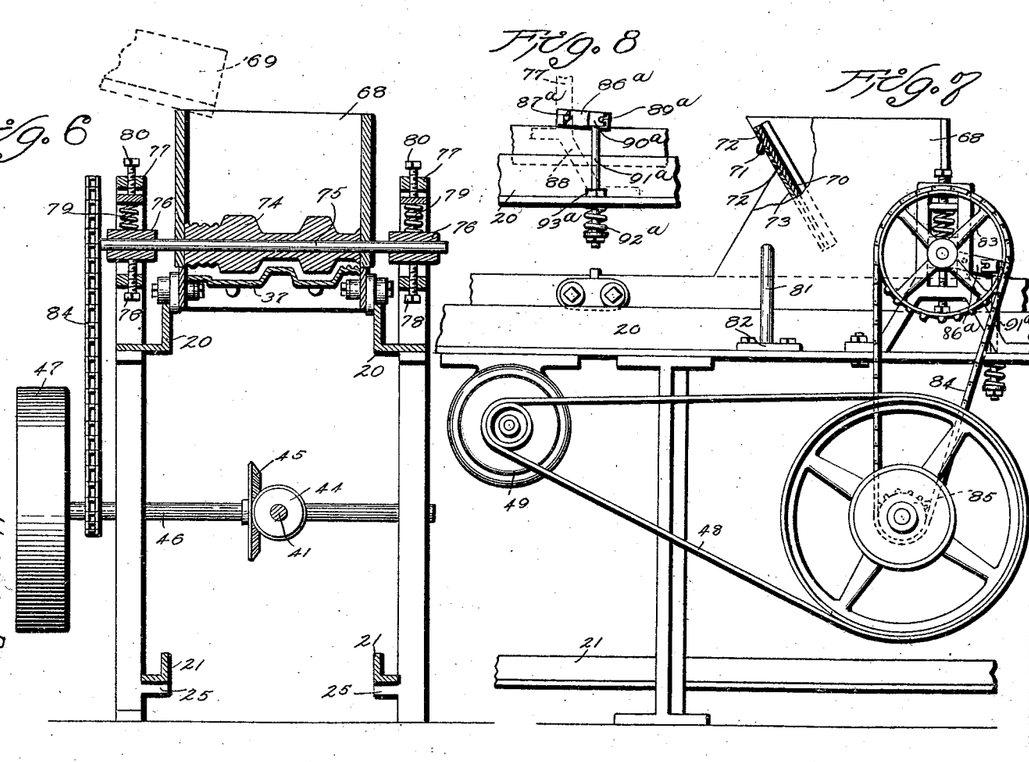
Figure 6 is a vertical transverse section taken substantially on line 6—6 of Figure 1, on an enlarged scale.
Figure 7 is a side view of the parts shown in Figure 6.
Figure 8 is an enlarged side view of a portion of the machine adjacent to one of the scrapers or trowels.

Referring now to these figures my invention proposes a rigid horizontal frame in which upper and lower pairs 20 and 21 of laterally spaced rails, disposed in lengthwise and parallel relation, are formed by angle bars as particularly seen in Figure 6 supported by the upper and lower ends of longitudinally alined series of side uprights 22. The upper rails 20, disposed with their inner upright webs in vertical alinement with the inner upright webs of the lower rails 21, are secured upon the upper T-shaped heads 23 of the uprights 22, certain of the latter of which, adjacent to the opposite ends of the frame, may be connected by cross beams 24 formed of angle bars for the support of the forward and rear portions of the lower rails 21, the remaining uprights having inwardly projecting lugs 25 on which the lower rails are secured.

Outstanding horizontally and lengthwise beyond the end uprights 22 of the frame at its forward and rear ends, are slotted brackets 26 and in these brackets are disposed the adjustable bearings 27 of cross shafts 28, the adjustment of the bearings being accomplished by adjusting screws 29.

On the shafts 28 between the brackets 26 are secured spiders whose outstanding arms 30 have transversely recessed extremities 31 for a purpose which will be presently described.

Figure 1:
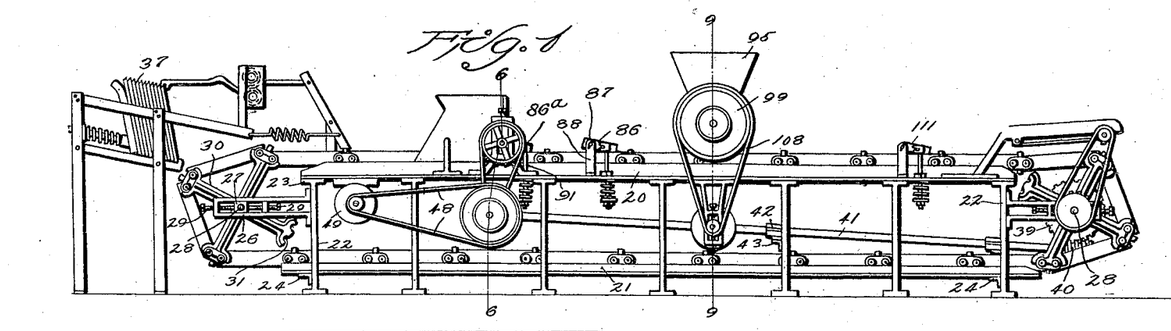
Figure 1 is a side elevation of the complete machine.

The endless belt of the carrier supported in movable relation in the frame just above described consists of lengthwise series of side plates 32, disposed in laterally spaced pairs, with their ends pivotally connected by bolts 33 to the inner surfaces of the oppositely angular extensions 34 at the ends of cross plates 35, the bolts 33 movably supporting rollers 36 outwardly beyond the cross plate extensions, adapted for engagement by the recessed ends 31 of the spider arms 30 as clearly seen by reference to Figure 1. The endless carrier or conveyer is thus divided by the cross plates 35 into a lengthwise series of compartments of which each compartment is bounded by a pair of the side plates 32 between adjacent cross plates, each of these compartments being adapted for the reception of a form plate 37 whose upper surface at least conforms to the desired shape of the lower surface of the finished tile, as will be seen by reference to Figure 6. These form plates in the successive compartments of the carrier are supported by virtue of their engagement upon the inner portions of the pivotal connecting bolts 33 and upon lugs 38 projecting from the lower portions of the cross plates 35.

The rollers 36 of the endless conveyer or carrier travel in the rearwardly moving upper run upon the upper rails 20 of the frame, and in the forwardly moving lower run, upon the lower rails 21 of the frame, the two spiders rotatable at the opposite ends of the frame engaging the conveyer or carrier as above described, and one at least of these spiders being driven for the purpose of bringing about proper movement of the carrier.

For this purpose the spider at the rear end of the frame is preferably rotated, its shaft 28 having a worm wheel 39 thereon engaged by the worm 40 at the lower rear end of a lengthwise extending forwardly and upwardly inclined shaft 41 disposed in the frame between its side uprights 22 and in one or more bearings 42, each supported by a cross piece 43 connected to the uprights. The upper forward end of this shaft 41 is provided with a bevel gear 44, in engagement with a bevel gear 45 of a cross shaft 46, the latter of which has at one projecting end a pulley 47, which may be connected as by means of a belt 48 to any suitable source of power as for instance an electric motor 49, the latter of which may if desired be secured within and supported by the frame of the machine so as to thus conveniently supply necessary rotation, through the connections just described, to the rear carrier actuating spider.

Figure 5:
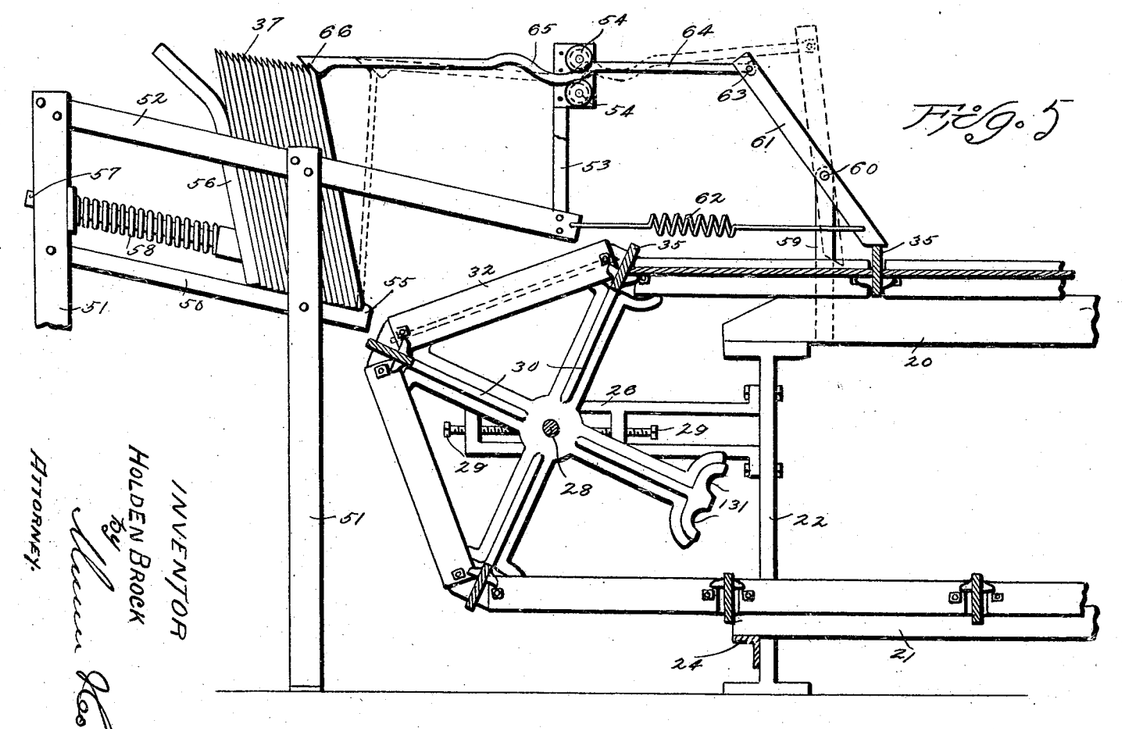
Figure 5 is an enlarged side view, partly broken away and in section, of the receiving end of the conveyer, showing the means for automatically feeding the form plates thereto.

As above stated each of the spaces of the endless carrier between its cross bars 35, is adapted to receive one of the form plates 37 and each of such spaces does in fact receive one of the form plates as it reaches the form plate receiving station in the course of rounding the upper portion of the forward spider, that is slightly in advance of the position shown in Figure 5.

According to the showing of Figures 1 and 5 an inclined feed table 50 is provided for a series of the form plates 37, supported upon uprights 51 and having upper guide rails 52 the latter of which are inclined and extended downwardly in order to support at their lower ends adjacent to the carrier upright supporting members 53 between the upper portions of which a pair of vertically spaced transversely extending guide rollers 54 are mounted. The lower edge of the feed table 50 is flanged as at 55 and an inclined follower 56 acts against the series of form plates 37 on the table to shift the latter against the flange 55, follower 56 having a guide pin 57 around which a spring 58 is coiled for the above purpose.

To one of the upper carrier supporting rails 20 adjacent its rear end is connected an upright 59 on the upper end of which is supported a fulcrum 60 of a lever 61 whose lower end is successively engaged and shifted rearwardly against the tension of a spring 62 by the several cross bars 35 of the carrier. The upper end of this lever 61 is pivotally connected at 63 to the rear end of a feed arm 64 which extends forwardly between the guide rollers 54 and is provided with vertical bends 65 intermediate its ends which during its lengthwise movement both forwardly and rearwardly, coact with the rollers 54 to shift the forward free and notched engaging head 66 of the feed arm in vertical directions. In this way each time the lower end of lever 61 is shifted rearwardly as seen in full lines in Figure 5, the feed arm 64 in its forward movement is raised and then lowered so that its notched head 66 engages the upper edge of the rearmost form plate of the series 37, and then as the engaging cross bar 35 passes rearwardly from beneath lever 61 in the further rearward movement of the carrier, the lever rocks in the opposite direction to the dotted line position, under tension of spring 62, the feed arm 64 in its forward movement being pressed downwardly at its forward end to follow the arc of movement of the upper edge of the engaged form plate and being subsequently elevated to release the same from the upper edge of the engaged form plate, allowing the latter to fall rearwardly and downwardly into one of the form plate receiving spaces of the carrier which will at that time be in proper position to receive the form plate. It will be understood that this is a practically continuous operation, which in so far as manual labor is concerned only necessitates that a proper supply of form plates 37 be maintained at all times upon the feed table 50.

According to the above then each of the form plate receiving spaces of the carrier becomes supplied with a form plate as it rounds the upper portion of the forward spider, just prior to its movement on to the forward ends of the upper carrier guide rails 20. In this position the forward and rear edges of each form plate rest upon the lugs 38 of adjacent cross bars 35 of the carrier, with its side edges upon the inner portions of the bolts 33, the form plate being then in a plane substantially below the upper edges of the side bars 32 of the carrier as well as the upper edges of the cross bars 35, the latter of which are grooved to correspond in general with the contour of the upper face of the form plate and the latter of which is shaped to conform to the desired lower surface of the tile. This is plainly to be seen by a comparison of the tile 67 shown in Figures 2 and 3 with the shape of the form plate 37 shown in Figure 6 and the shape of the recessed upper edge of the cross bar 35 shown in Figure 9.

Above the main frame adjacent to its forward end is supported a hopper 68 downwardly into which the material may be intermittently dumped by hand or continuously fed by means of a chute 69 shown in dotted lines in Figure 6, and from the lower open end of which hopper, beneath which the movable carrier passes, the material is automatically fed under control of an adjustable feed gate 70 having a lug 71 by means of which it may be adjusted to the various apertures 72 in a vertical series along one inclined wall 73 of the hopper.

At the rear lower portion of this hopper 68 a roller 74 is mounted transversely thereof, with its surface contoured to accord with the desired shape of the upper surface of the finished tile and to accord with the recessing of the upper edges of the several cross bars 35 of the carrier. The result is that this roller is spaced above each form plate 37 as the latter passes beneath the plate, the desired thickness of the tile.

The roller 74 just above mentioned is secured within the hopper upon a cross shaft 75 journaled through and extending at its opposite ends beyond the side walls of the hopper, and with its opposite extremities disposed in bearings 76 adjustably mounted in brackets 77 rising from the upper carrier guide rails 20. Vertically through the lower portions of these brackets 77 are adjusting screws 78 which operate as a positive though adjustable limit to downward movement of the bearing 76, the latter of which are yieldingly held in the lower position against the adjusting screws 78 by means of springs 79 under control of adjusting screws 80 threaded through the upper portions of brackets 77.

The lower side edges of the hopper 68 are thus yieldingly held against the upper edges of the side bars 32 of the carrier, as the hopper yields vertically with the shaft 75, its connection being by means of a U-shaped rod 81, the downturned ends 82 of which are secured to the upper side rails 20 and the cross bar of which passes loosely through the side walls of the hopper adjacent to their lower forward portions.

At one end shaft 75 has a sprocket wheel 83, engaged by the upper portion of a sprocket chain 84, the lower end of which extends around a sprocket wheel 85 secured on the driven shaft 46 before described.

Thus the material fed downwardly on to the carrier within hopper 68 is immediately pressed evenly and firmly downwardly against the several form plates in the form plate receiving recesses of the carrier by means of the roller 74, and as each form plate receiving recess of the carrier passes rearwardly beneath the hopper 68 it is quite obvious the material will then be pressed to the form of the finished tile both as to its upper and lower surfaces. Immediately after pressure by the roller the material passes beneath a sizing shaper 86$^a$ shown particularly in Figures 7 and 8, which is pivoted at 87$^a$ to the bracket or hanger 77 and is controlled by spring actuated rods 91$^a$. The upper heads 90$^a$ of these rods 91$^a$ engage side pins 89$^a$ of the shaper 86$^a$ and their lower portions depend through the side rails 20 and are engaged by springs 92$^a$ and an adjustable movement limiting nut 93$^a$. This shaper operates under adjustable pressure to effectively size and shape the formed and rolled tile.

As the formed tiles pass rearwardly after the rolling and sizing of the plastic material upon the form plates, they pass beneath the first smoothing or troweling device, in the nature of a generally horizontal plate 86 whose forward portion is pivoted by side pivots 87 to side supports 88 upstanding from the side rails 20, and the sides of whose rear portion have laterally outstanding pins 89 engaged by the upper recessed heads 90 of controlling rods 91 which pass downwardly through the outstanding horizontal flanges of the side rails 20 and are engaged by springs 92 whose function is to yieldingly hold the rear portion of the troweling plate 86 downwardly against the plastic tile as the latter move rearwardly so that there will be a scraping or smoothing action of the upper surface of the plastic material, for which purpose the rear edge of the troweling plate 86 is of course recessed to correspond to the particular shape of the tile and to the particular recessing of the cross bars 35 of the carrier. The rods 91 are also engaged by adjustable stop nuts 93 which abut the upper surfaces of the side flanges of guide rails 20 so that the springs 92 cannot act to cause excessive friction between the troweling plate and the upper edges of the carrier.

Subsequent to its passage beneath the troweling plate 86, each of the plastic filled spaces of the carrier moves beneath a cement or other powder holding hopper 95 around the lower open end of which is secured a reticulate curved base 96, the latter held by adjustable clamps 97 at the lower side portions of the hopper in order to permit of ready renewal of the reticulate base when such renewal becomes necessary. Journaled by means of stub shafts 98 at its opposite ends, one of which supports a belt pulley 99, is a stirring or agitating feed wheel 100, whose lengthwise peripheral blades 101 act against the reticulate base 96 of the hopper to cause an effective sifting of the material through the reticulate base in a continuous manner so as to thoroughly dust the upper surfaces of the tile as they pass successively beneath the hopper.

Figure 9:
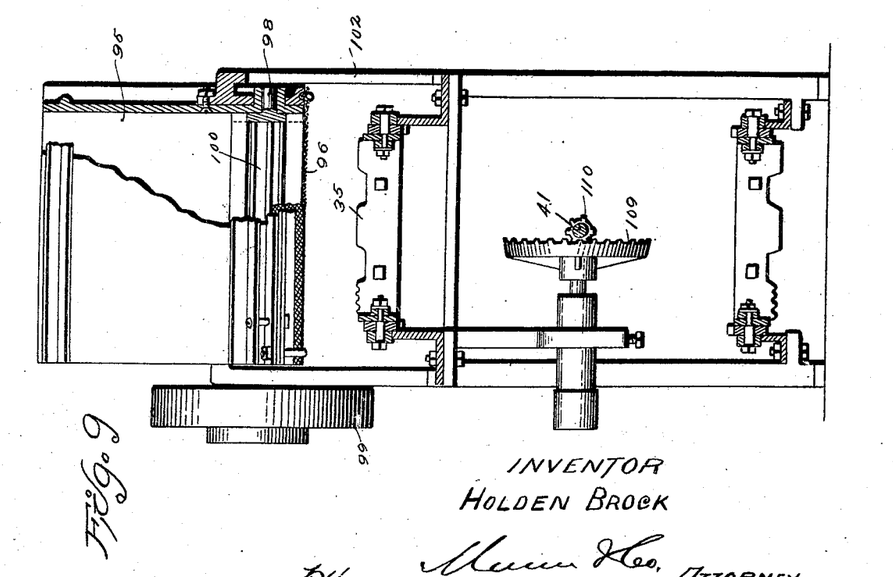
Figure 9 is an enlarged vertical transverse section taken substantially on line 9—9 of Figure 1.
Figure 10:
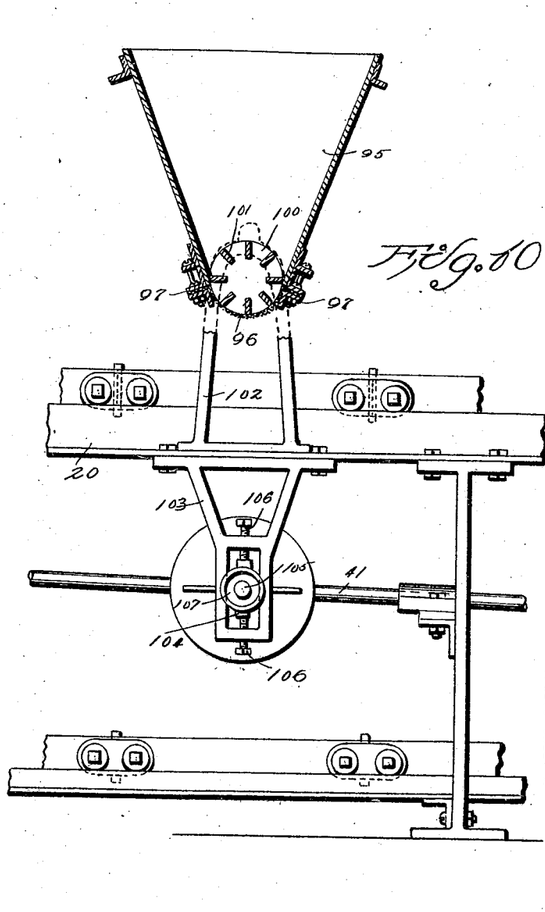
Figure 10 is a side view, partly broken away and in section, of the parts shown in Figure 9.

The hopper 95 is supported upon upright brackets 102 rising from the upper side rails 20 as seen particularly in Figures 9 and 10, and the sifting device has associated therewith a depending bracket 103 which carries the adjustable bearing 104 of a short shaft 105. This shaft is adjusted so that its axis alines with the main driven shaft 41, by means of adjusting screws 106 which engage the upper and lower surfaces of its adjustable bearing 104. At its outer end the shaft 105 carries a pulley 107, connected by a belt 108 with the pulley 99 before described, and has upon its inner end an enlarged gear member 109 engaging the gear 110 on the main driven shaft 41.

After passage beneath the surface dusting arrangement just above described, the plastic tile are successively engaged and acted upon by a second troweling plate 111, supported and operating substantially similar to the device 86 before described, troweling plate 111 being supported and operating adjacent to the rear discharge end of the frame where the form plate with their plastic covering complete and ready for drying are successively and automatically discharged prior to the movement around the rear spider which brings about rotation of the endless carrier.

Figure 11:
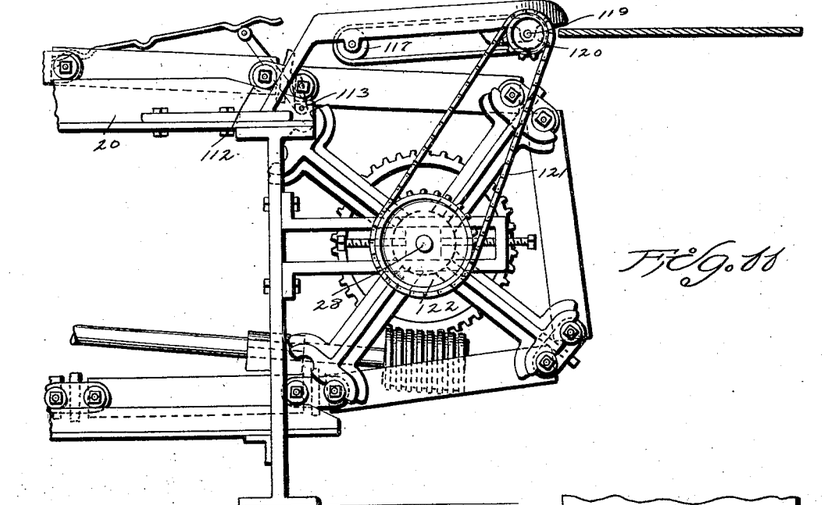
Figure 11 is an enlarged side view of the discharge end of the machine.
Figure 12:
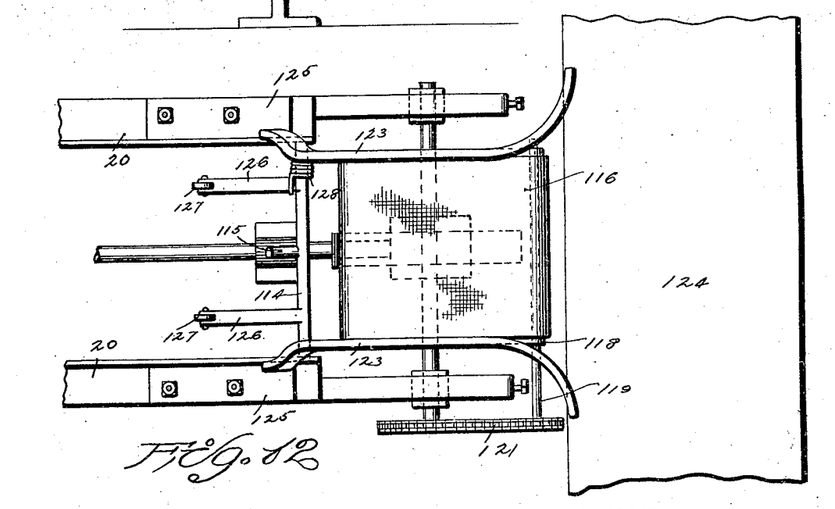
Figure 12 is a top plan view of the parts shown in Figure 11.

At the rear end of the frame, as shown particularly in Figures 11 and 12, the upper guide rails 20 have beveled portions 112, their extremities supporting the journals 113 of a rotatable cross bar 114 having a centrally disposed angular arm 115 for successive engagement and elevation by the several cross plates 35 of the carrier. This cross rod 114 is mounted below the forward end of an endless belt 116 rotatable around forward and rear rollers 117 and 118, one end of the shaft 119 of the latter of which is extended and provided with a sprocket wheel 120 connected by a sprocket chain 121 with a sprocket wheel 122 mounted on the shaft 28 of the rear spider. This endless belt 116 operates in a frame whose side bars 123 terminate at their rear above the adjacent edge of a support 124 which may be either a stationary table or a laterally moving conveyer, the forward ends of the side bars 123 being secured in connection with brackets 125 connected upon the rear ends of the upper side rails 20.

The cross rod 114 has a pair of forwardly projecting side arms 126, each having a roller 127 at its forward end, engageable with the lower surface of the form plates 37 so as to elevate the latter on to the belt 116 when cross rod 114 is rocked in one direction against the tension of its spring 128, by engagement of one of the cross plates 35 with the arm 115. This movement is seen in Figure 11 and the result is that each form plate with a tile in a plastic state thereon, is elevated on to the belt 116, and by means of this moving belt, is shifted on to the support 124 for transportation to either a nearby or distant point where the tile are dried.

Thus it becomes obvious that the form plate receiving spaces, which receive the form plates 37 at the front end of the frame in the form plate receiving station, are finally and automatically emptied just before reaching the rear end of the frame so that the lower run of the carrier travels in open unoccupied condition along the lower guide rails 21.

Figures 13, 14, 15:
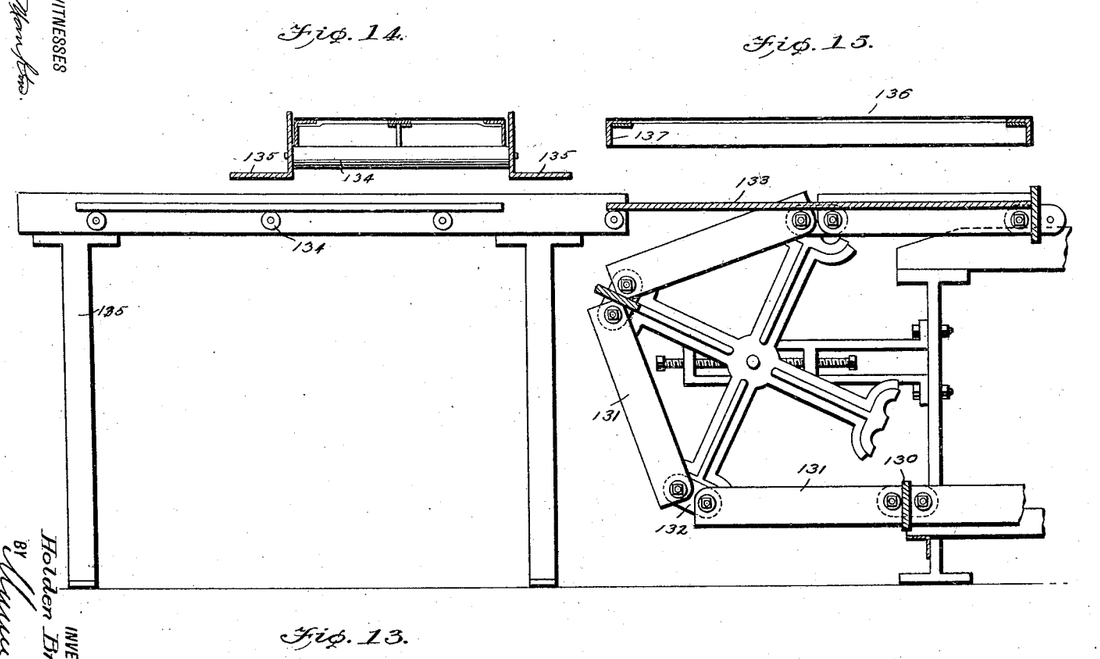
Figure 13 is an enlarged side view, partly in section of the receiving end of the conveyer showing a modified construction.
Figure 14 is a cross section through the feed table taken substantially on line 14—14 of Figure 13.
Figure 15 is a longitudinal section through one of the form plates showing a modified construction.

In Figures 13, 14 and 15 I have shown a slightly modified construction wherein the endless carrier has cross bars 130 between every second joint or more of its side plates 131 instead of at every joint in the construction previously described, certain of the ends of the side plates 131 being flexibly connected simply by means of straps 132 so as to adapt the carrier to receive form plates 133 of considerable length, in which case these form plates may be fed by hand across the transverse rollers 134 of a feed table 135 seen in Figure 13.

In Figures 14 and 15 in particular I have shown a slightly modified construction as to the form plates themselves where instead of a simple pressed sheet metal plate, the form plates 136 are shown supported by an angle iron frame 137.

Figure 18:
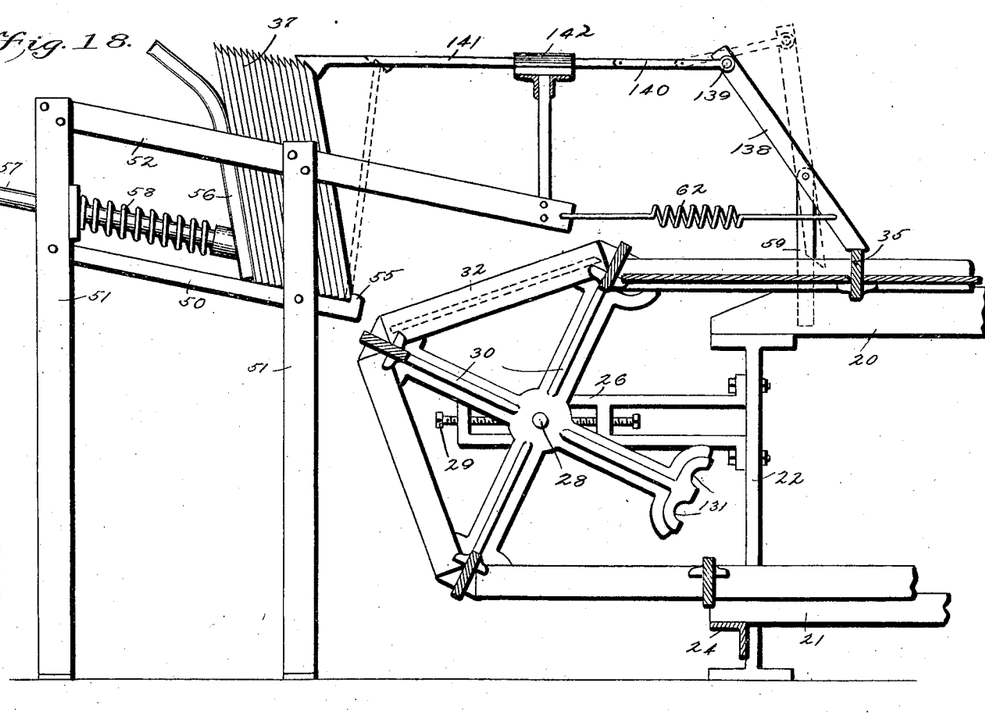
Figure 18 is an enlarged side view, partly in section, of the receiving end of the machine showing a slightly modified form of plate feed mechanism.

In Figure 18 moreover I have shown a modification in respect to the feed arms, wherein the carrier actuated lever 138, in all respects similar to the lever 61 previously described, is pivotally connected at its upper end at 139 to the jointed part 140 of a feed arm 141, the latter of which slides through a guide 142 and is sufficiently flexible so that in its forward movement it will catch over the upper edge of the foremost form plate 37 of the series on the feed table. In other respects this construction is the same as that previously described and shown in Figure 5.

Figures 2, 3, 4:
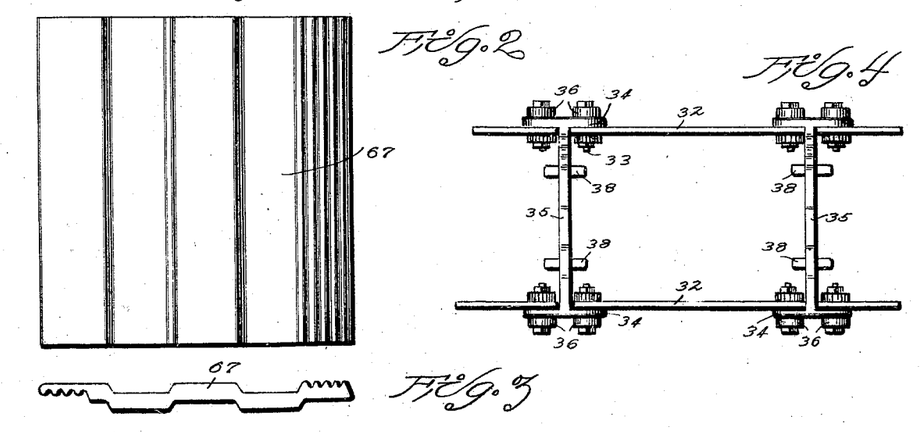
Figure 2 is a plan view of a tile formed thereby.
Figure 3 is an edge view thereof.
Figure 4 is a top plan view of a portion of the endless conveyer.
Figure 16:
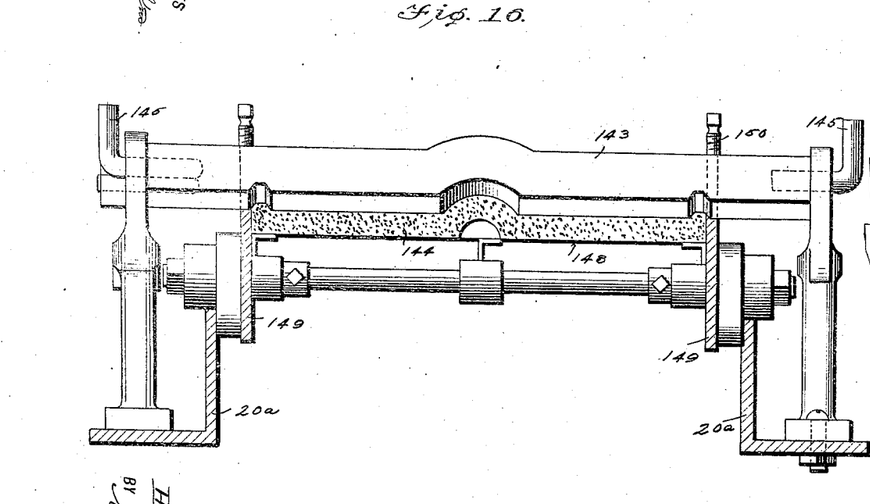
Figure 16 is an enlarged cross section through the machine adjacent to one of the scrapers or trowels.
Figure 17:
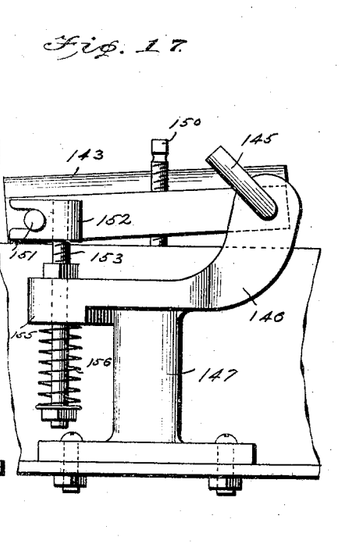
Figure 17 is a side view of the parts shown in Figure 16.

In Figure 16 I have shown a slight modification in respect to the troweling plate, a troweling plate 143 being shown in this figure whose free edge is cut away on a slightly different configuration to cooperate in the production of a tile shown at 144 which is somewhat different from the tile shown in Figures 2 and 3. The troweling plate 143 is moreover pivoted by means of side pins 145 entering the same adjacent to its opposite edge and extending through the forwardly projecting wings 146 of uprights 147, the latter of which are secured to and upstand from the upper side rails 20ª of the carrier. In this figure the form plate is indicated at 148 of the construction just above described in connection with Figures 14 and 15, the free edge of plate 143 resting on the upper edges of the side plates 149 of the endless carrier under control of adjusting screws 150 threaded vertically through the plate as shown. Adjacent to its rear lower edge troweling plate 143 has outstanding side pins 151 engaged by the upper notched heads 152 of adjusting screws 153, the adjusting nuts 154 of which rest upon the rearward extensions 155 of the supporting uprights 147, through which the adjusting screws 153 loosely extend. Around the lower portions of these adjusting screws are springs 156 which thus yieldingly hold the rear edge of the troweling plate in the lower effective position in engagement with the material to be surfaced, located within the several material receiving spaces of the carrier.

Figure 19:
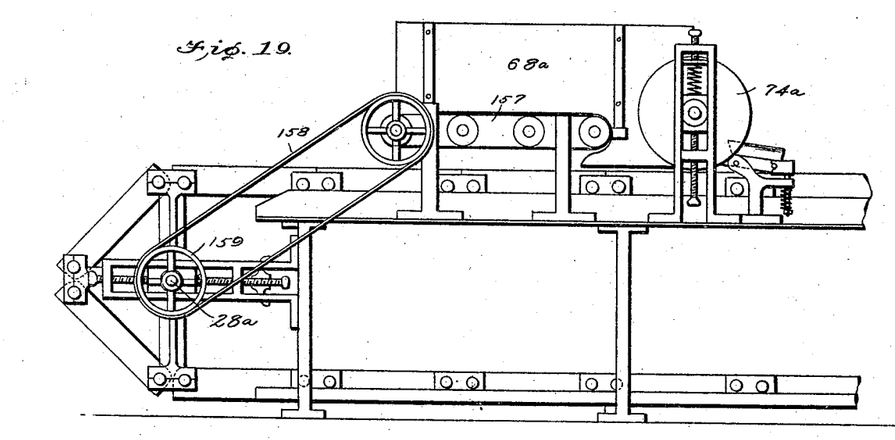
Figure 19 is a partial side view illustrating another slight modification desired where reinforcements are utilized in the tile being manufactured.
Figure 20:
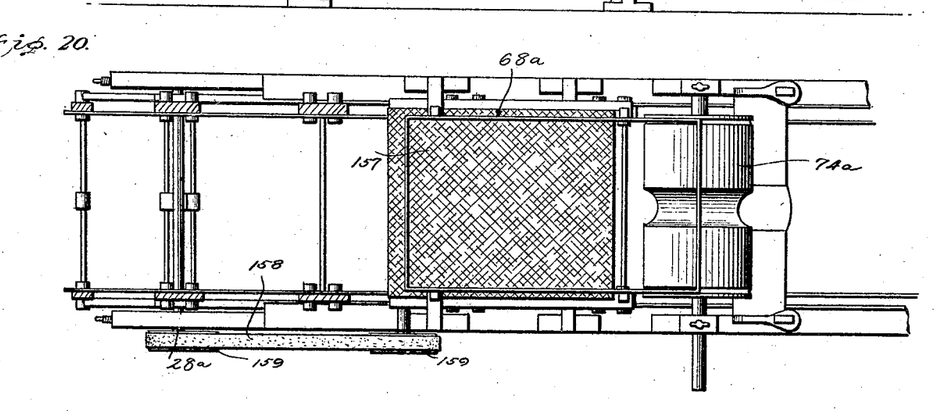
Figure 20 is a top plan view of the parts shown in Figure 19.

In Figures 19 and 20 I have shown a modification in respect to feed of material to the form plates of the conveyer for utilization where, on account of size of the finished product or heavy work, reinforcements, for instance reinforcing rods are placed in the material receiving spaces. In such case material dumped through a hopper such as hopper 68 previously described has a tendency to displace the reinforcing rods, and to offset this disadvantage I may employ a lengthwise elongated hopper 68ª as in Figures 19 and 20, in the lower forward portion of which a conveyer 157 is horizontally disposed and operates to continuously force the plastic material rearwardly against the pressure roller 74ª so that it will be pressed downwardly by the latter evenly and uniformly into the material receiving spaces and air bubbles and the like pressed out of the material without disturbing the previously positioned reinforcing rods or members. This conveyor 157 may be driven by any suitable means, as for instance a belt 158 from a pulley 159 on the forward main conveyer shaft 28ª, or from some other suitable point, and it is obvious that in thus providing for effective reinforcement I do so with minimum extra parts and without undesirable complication.

The modified construction which is thus evidently possible in connection with the several parts of the apparatus does not however effect its general construction, operation or function, and it is obvious that the modifications as described are capable of mutual operation in the manner before described to bring about the general result sought for.

I claim:

1. A machine of the character described including an endless carrier having spaced side bars and cross bars forming a lengthwise series of open material receiving spaces, links between the side bars supporting the said cross bars, a series of form plates constituting removable bases for said spaces, means for feeding the form plates into the successive spaces of the carrier at one point in the length of the latter, means for discharging the form plates from the carrier at another point in the length of the latter, and means between the said points for feeding, working and surfacing plastic material within the carrier spaces on the form plates.

2. A machine of the character described including an endless carrier having spaced side bars and cross bars forming a series of tile forming spaces therein open at their upper and lower ends, links between the side bars, with which the cross bars are integral, a series of form plates constituting removable bases for the tile forming spaces of the carrier, means for automatically feeding the form plates into the tile forming spaces of the carrier at one point in the length of the latter, means for automatically discharging the form plates from the carrier at another point in its length, means between said points for feeding and working plastic material into the said carrier spaces upon the form plates for subsequent discharge with the form plates, and means for surfacing the material after it is fed into and worked within the said spaces as described.

3. A machine of the character described including an endless moving carrier having spaced side bars and cross bars forming material receiving spaces open at their upper and lower ends, links between the side bars with which said cross bars are integral, said cross bars having supporting lugs, a series of form plates constituting removable bases for said material receiving spaces and seatable on said lugs, means actuated by the carrier for feeding the form plates into the said spaces at one point in the length of the carrier, means also actuated by the carrier for discharging the form plates from the material receiving spaces at another point in the length of the carrier, and means located between said points for feeding, working and surfacing plastic material within the spaces and upon the said form plates.

4. A machine of the character described including a frame having bearing supports at its opposite ends, bearings adjustable in said supports, spiders journaled in said bearings having recessed outer ends, a carrier which travels around the spiders and through the frame, including a series of side bars, links connecting the ends of the said bars and having pivot bolts extending therethrough, rollers on the said pivot bolts to extend into the recesses of the spider arms, cross bars integral at their ends with the said links between the ends of the side bars and forming with the latter a series of form plate receiving spaces in the carrier, means for feeding form plates into the spaces at one end of the frame, means for discharging the form plates from the spaces at the opposite end of the frame, and means in the length of the frame for feeding, working and surfacing plastic material upon the form plates.

5. A machine of the character described including a frame having bearing supports at its opposite ends, bearings adjustable in said supports, spiders journaled in said bearings having recessed outer ends, a carrier which travels around the spiders and through the frame, including a series of side bars, links connecting the ends of the said bars and having pivot bolts extending therethrough, rollers on the said pivot bolts to extend into the recesses of the spider arms, cross bars integral at their ends with the said links between the ends of the side bars and forming with the latter a series of form plate receiving spaces in the carrier, means for feeding form plates into the spaces at one end of the frame, means for discharging the form plates from the spaces at the opposite end of the frame, and means in the length of the frame for feeding, working and surfacing plastic material upon the form plates, said cross bars having outstanding lugs at their opposite sides to support the form plates within the form plate receiving spaces as described.

6. In a machine of the character described, an endless carrier having a series of form plate receiving spaces and cross plates between said spaces, a feed table adjacent to the carrier, a series of form plates on the feed table, and carrier actuated means for successively feeding the form plates into the spaces of the carrier including a movable feed arm to engage and shift the form plates, and a lever connected at one end to the feed arm and having its opposite end disposed in the path of movement of the cross plates of said carrier.

7. In a machine of the character described, an endless carrier having a lengthwise series of form plate receiving spaces and cross plates between said spaces, an inclined feed table having its flanged lower edge adjacent to the carrier, a series of form plates on the feed table, means for holding the series of form plates in engagement with the flanged edge of the feed table, means shiftable into engagement with the upper edge of the foremost feed plate for swinging the same outwardly on to the carrier, consisting of a feed arm and a lever pivotally connected at one end to the feed arm and having its opposite end disposed in the path of movement of the cross plates of the carrier, and a spring engaging the lever to shift the same in one direction.

8. In a machine of the character described, a carrier, a frame on which the carrier is movable, means adjacent to one end of the frame for feeding form plates into the carrier, means for forming plastic tile on the form plates in the length of the carrier, a cross rod in the frame adjacent to its opposite end having vertically swinging form plate lifting arms and carrier actuated means for rocking the same to shift the arms vertically beneath each successive form plate, and an elevated conveyer arranged to receive the form plates when they are shifted vertically under actuation of said arms.

9. In a machine of the character described, an endless movable carrier having a plurality of cross plates dividing the same into a lengthwise series of form plate receiving spaces, a frame on which the carrier is supported, means adjacent to one end of the frame for feeding form plates into the said receiving spaces, means for forming plastic tile on the plates in the length of the carrier, a rod journaled crosswise of the frame adjacent to its opposite end, having vertically swinging arms beneath the carrier and a projecting pin successively engageable by the cross plates of the carrier to rock the rod and swing the arms vertically against the form plates, and a conveyer disposed in elevated relation above the carrier adjacent to the last mentioned end of the frame to receive the successively elevated form plates as described.

HOLDEN BROCK.